April 1, 1924.
J. A. GEISER
1,488,636
WIRE CONNECTER
Filed May 24, 1920
3 Sheets-Sheet 1
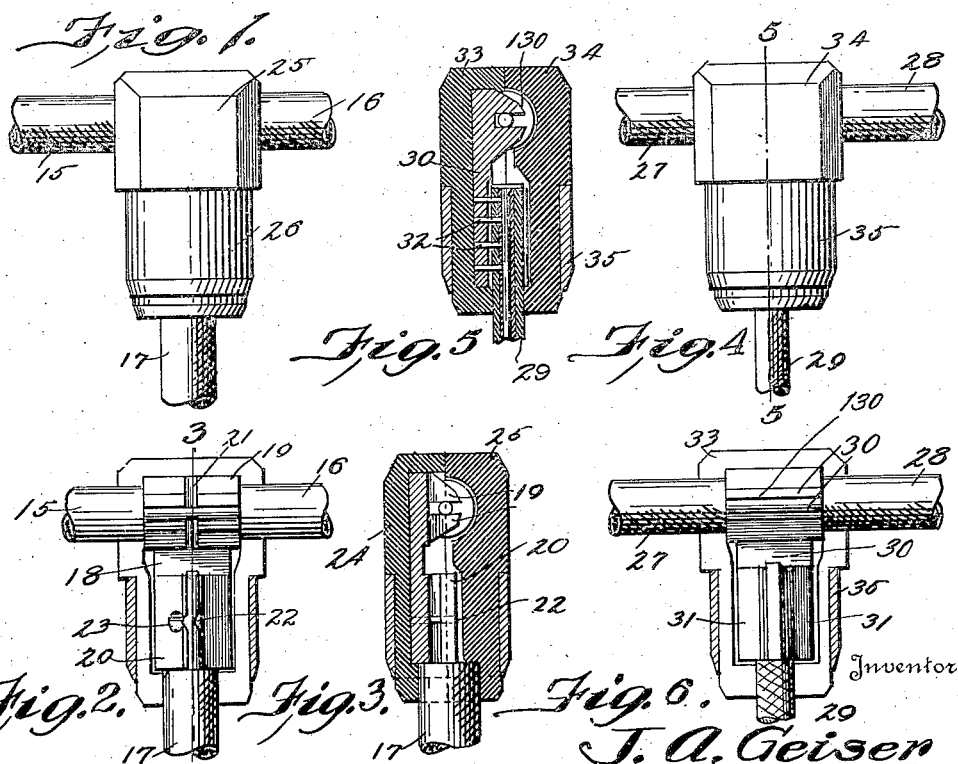

April 1, 1924.
J. A. GEISER
1,488,636
WIRE CONNECTER
Filed May 24, 1920
3 Sheets-Sheet 2
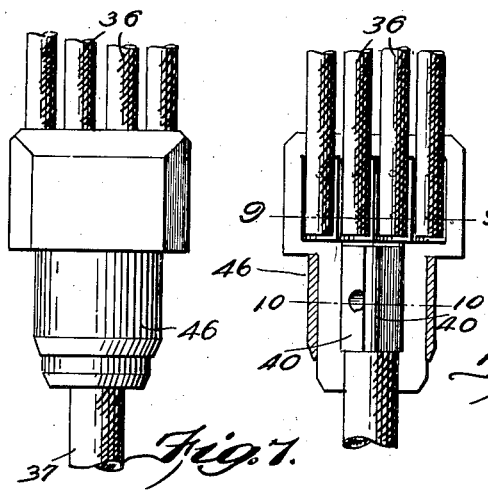
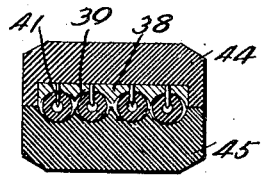
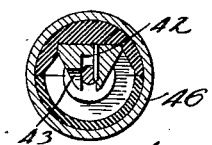
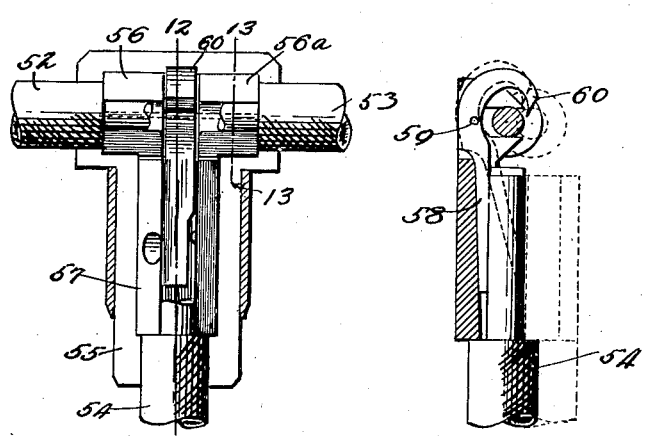
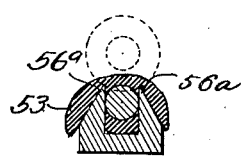

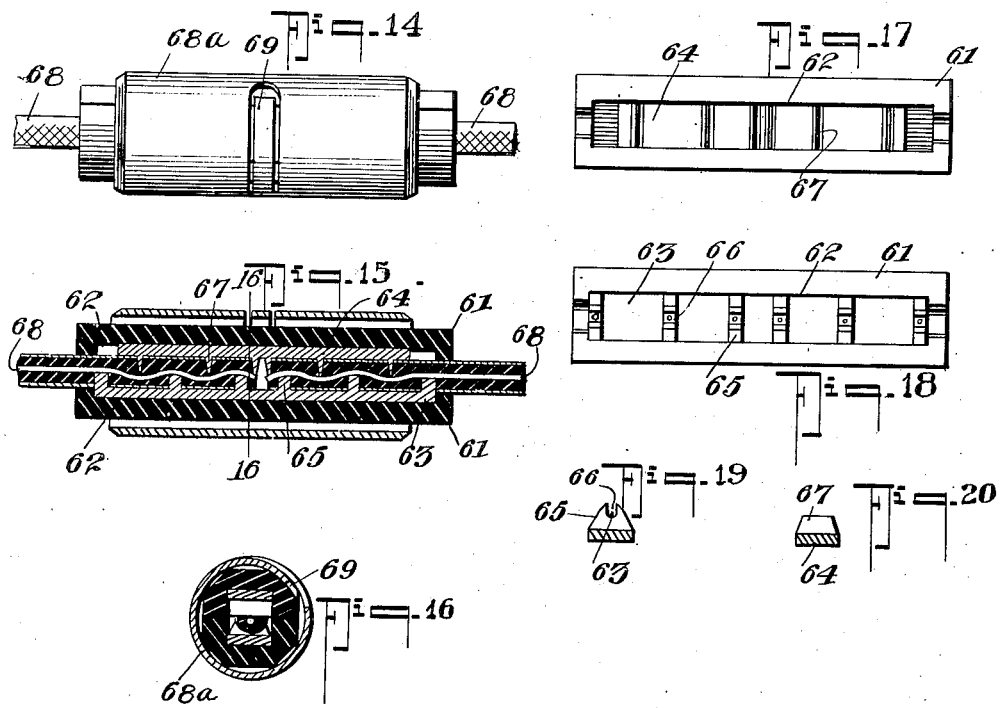

Patented Apr. 1, 1924.

1,488,636

UNITED STATES PATENT OFFICE.

JOHN ALBERT GEISER, OF FERGUSON, MISSOURI.

WIRE CONNECTER.

Application filed May 24, 1920. Serial No. 383,747.

*To all whom it may concern:*

Be it known that I, JOHN ALBERT GEISER, a citizen of the United States, and a resident of Ferguson, in the county of St. Louis and State of Missouri, have invented certain new and useful Improvements in Wire Connecters, of which the following is a specification.

My invention is an improvement in wire connecters, and has for its object to provide means for connecting insulated wires electrically to other wires or to any type of electrical device, without the necessity for removing the insulation from the wires before connecting them.

In the drawings:

Figure 1 is a plan view of the connecter.

Figure 2 is a view of a modification with the top half of the enclosing casing removed.

Figure 3 is a section on line 3—3 of Fig. 2.

Figure 4 is a plan view of another modification of the invention.

Figure 5 is a section on line 5—5 of Fig. 4.

Figure 6 is a plan view, with the top half of the casing removed.

Figure 7 is a plan view of another embodiment of the invention.

Figure 8 is a similar view, with the top half of the casing removed.

Figures 9 and 10 are sections on the lines 9—9 and 10—10 respective, of Figure 8.

Figure 11 is a plan view of another embodiment of the invention.

Figure 12 is a section on the line 12—12 of Figure 11.

Figure 13 is a section on the line 13—13 of Figure 1.

Figure 14 is a top plan view of another embodiment of the invention.

Figure 15 is a longitudinal section.

Figure 16 is a section on line 16—16 of Figure 15.

Figure 17 is a plan view of one section of the connecter.

Figure 18 is a plan view of the other section.

Figure 19 is a horizontal section through one of the metallic plates.

Figure 20 is a similar view through the other plate.

In Figures 1, 2 and 3, the wires 15, 16 and 17 are connected in T-formation, by means of a metallic conducting element of T-shape. This conducting element, as shown, comprises a T-shaped base 18 having pairs of knife edges 19 and 20, the knife edges being right-triangular ribs arranged in pairs, the members of each pair having their adjacent faces parallel and spaced apart from each other, and their inclined faces outward. The knife edges or ribs 19 are separated at their centers by a transverse groove 21, which provides a pair of knife edge ribs for each wire 15, 16 and 17.

In placing the wires they are merely forced into the grooves between the ribs. These ribs are spaced apart a distance corresponding approximately to the diameter of the wire, the arrangement being such that there will be a tight fit when the wire is passed between the ribs. They may be forced into the space between the ribs in any suitable manner, and it will be evident that as the wires are forced into the ribs the insulation will be cut away from the wires, so that the wires will engage the faces of the ribs directly.

Preferably, one of the ribs 20 has a pin 22 which is adapted to force the wire 17 laterally, and the other rib has a notch or recess 23 for permitting the wire to move laterally slightly. The pin 22 will force the wire laterally, and a portion of the wire will enter into the notch or recess, thus forming a positive lock between the ribs 20 and the wire 17.

These knife edges provide strippers for stripping the wire, and the base of the conducting element provides an electrical connection for the ribs and the wires. The casing is held in a housing of insulating material, consisting of sections 24 and 25, the complete housing being substantially T-shaped, as shown in Figure 1, and the stem portion of the housing is encircled by a ferrule or ring 26 to clasp the sections 24 and 25 on the casing.

In the embodiment of the invention shown in Figures 4, 5 and 6, the wires 27 and 28 and 29 to be connected are arranged in T-formation, the wires 27 and 28 being in alinement, and the wire 29 at right angles thereto. The wires are connected by a casing consisting of a base 30, which has knife edge ribs 130 extending transversely of one end thereof, and corresponding to ribs 19 of Figure 2, and which has similar ribs 31 extending longitudinally thereof at the opposite end from the ribs 30, and corresponding to the ribs 20 of Figure 2.

At the bottom of the groove between the ribs 31 a series of pins 32 is provided, the said pins being of a length to extend through the insulating covering of the wire 29, and the pins are pointed. The casing 30 is enclosed by a sectional housing 33—34 of insulating material, which is held in place by the ring or ferrule 35.

In the embodiment of the invention shown in Figures 7 to 10, a group of wires 36 is connected with a single wire 37. With this arrangement the connecter casing comprises a base 38 having a series of grooves 39 at one end, the said grooves being parallel and extending longitudinally of the base and at the opposite end the base has a pair of knife edge ribs 40 also extending longitudinally of the base, and adapted to receive the wire 37, the grooves 39 being designed to receive the wires 36. Each of these grooves 39 has a series of pins 41, and the groove between the ribs 40 has a pin 42 at one rib and a notch or recess 43 in the other rib, this pin and notch serving the same purpose as the pin 22 and the notch 23 of Figure 2. The casing is enclosed by a sectional housing 44—45 which is held on the connecter casing by a ring or ferrule 46.

In Figures 11, 12 and 13, the wires 52 and 53 and 54 are connected by a metallic casing consisting of a base 55 and pairs of knife edge ribs 56, 56ª and 57. The ribs 56 and 56ª are in alinement, and are separated from each other by a groove, as shown, which registers with the space between the ribs 57. A lever 58 is pivoted in this groove between the pairs of ribs 56 and 56ª, as indicated at 59, and this lever on one side of the pivotal connection 59 lies in the groove between the ribs 57. The other end of the lever is hooked or C-shaped as shown at 60, and the free end thereof, which is beveled, extends into the groove between the ribs 56 and 56ª, when the other end of the lever 58 is in the space between the ribs 57. The ribs 56 and 56ª and 57 will strip the insulation from the wires 52, 53 and 54 when the said wires are forced into the grooves between the ribs, and the sharp edge of the C-shaped portion 60 of the lever 58 assists in this stripping.

It will be understood that the pins in any of the constructions may be staggered, if desired.

In the use of the construction shown in Figures 11, 12 and 13, which construction is especially adapted for connecting two wires at a right angle, but one wire is inserted in the groove between the ribs 56 and 56ª. As the wire is pressed into the grooves, the insulation is cut away from the sides, as shown in Figure 13. The lever 58 is swung, as indicated in dotted lines, in Figure 12, so that the cutting edge at the end of the portion 60 is moved above the wire and does not interfere with the insertion of the wire. After the wire 52—53 has been placed, the wire 54 is placed between the ribs 57. The lower end of the lever 58 is now forced down to the bottom of the space between the ribs 57 and the pointed end of the portion 60 of the lever is forced into close contact with the wire.

In the embodiment of the invention shown in Figures 14 to 20, the connecter comprises a casing of insulating material consisting of similar sections 61, which, when in normal position, constitute a casing of substantially cylindrical form. These sections are grooved on their inner faces to form a bore when they are placed together, and each groove 62 is of greatest depth intermediate its ends, as shown in Figure 15. Metallic conducting elements, indicated at 63 and 64, are arranged in the respective sections of the insulating casing, and, referring to Figures 17 to 20, inclusive, it will be seen that the section 63 is a plate having a series of transverse ribs, indicated at 65, each of which is notched, as indicated at 66, and the notches are in alinement longitudinally of the plate.

The edges of the notches are sharpened, as clearly shown in Figure 19, to form cutting edges for stripping the insulation from the wire as the wire is pressed between the ribs. The section 64 is in the form of a plate having transverse ribs 67, and these ribs are arranged so that when the sections are placed one above the other the ribs 67 will come between the ribs 65. Referring to Figure 17, it will be seen that six ribs are provided on the conducting element 64, two being at the center and the others at the ends, and the two central ribs are nearer together than are the other ribs. The element 63 also has six ribs, and the two central ribs are nearer together than the others. The central ribs of the sections 64 are adapted to engage between the two central ribs of the section 63, as shown in Figure 15, in order to bend down the ends of the wires 68, which are arranged between the conducting elements.

The recesses or grooves 62 in the casing section 61 are shaped to receive the conducting elements 63 and 64, and the wires are laid in these grooves and on the element 63. When the upper section of the casing is placed on these wires and pressed downwardly, the metallic wire filament inside the insulation will be pressed down into the notches 66, and the ribs 67 which are sharp edged will cut through the insulation between the ribs 65. The edges of the notches 66 on the ribs 65 will also cut through the insulation and an electrical connection will be established.

The casing sections are held together on the wires by means of a metal sleeve 68ª. This sleeve is of a size to fit over the sections when they are abutted and it has intermediate its ends a circumferentially extending tongue 69 which is adapted to engage in a circumferentially extending notch in one of the sections 61 to prevent the sleeve from movement longitudinally of the sections. The tongue is resilient so that the sleeve may be detached when desired. This engagement of the sleeve is shown in Figure 16.

In the construction of Figures 14 to 20 means is provided for cutting the insulation crosswise as well as longitudinally of the filament, namely, the ribs 67. Preferably, the lower section 63 of the conducting element is provided with pins within the notches 66. With this arrangement contact is made with each wire on four sides, namely, above, below and at each side thereof.

I claim:

1. A wire connecter comprising a base having spaced ribs defining wire contact grooves, said ribs being formed with cutting edges adapted to remove a portion of the insulation from the wire.

2. A wire connecter comprising a base having spaced ribs defining wire contact grooves, said ribs being formed with cutting edges adapted to remove a portion of the insulation from the wire, and a closure for said base.

3. A wire connecter comprising a base having spaced ribs defining wire contact grooves, said ribs being formed with cutting edges adapted to remove a portion of the insulation from the wire, and wire contact pins arranged in said grooves.

4. A wire connecter comprising a base having spaced ribs defining wire contact grooves, said ribs being formed with cutting edges adapted to remove a portion of the insulation from the wire, wire contact pins arranged in said grooves, and a closure receiving said base and extending beyond the ends of the same.

5. A wire connecter comprising a base having spaced ribs defining wire contact grooves, said ribs being formed with cutting edges adapted to remove a portion of the insulation from the wire, wire contact pins arranged in said grooves, a closure receiving said base and extending beyond the ends of the same, and means to hold said closure in engagement with said base.

6. A wire connecter comprising a base having spaced ribs defining a wire receiving groove, said ribs being formed with cutting edges adapted to remove a portion of the insulation from the wire, spaced wire contact pins arranged in said groove, a sectional closure receiving said base and extending beyond the same, and means encircling the sections of said closure to hold the same in set position.

JOHN ALBERT GEISER.